Sept. 11, 1934.     D. J. HANNA     1,973,625
FEEDING MECHANISM
Filed July 31, 1933     4 Sheets-Sheet 1

Inventor
David J. Hanna,
By Church & Church
His Attorneys

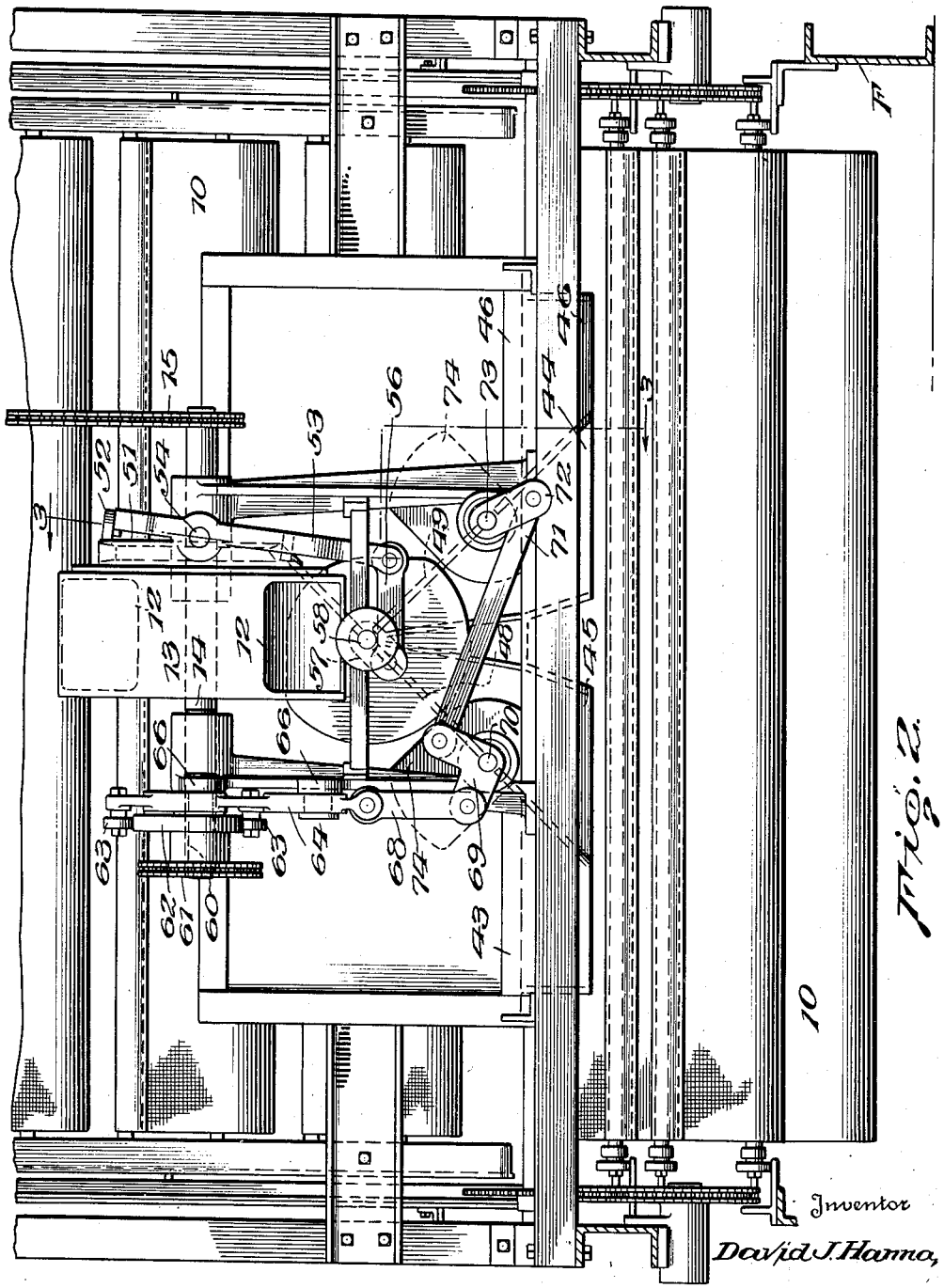

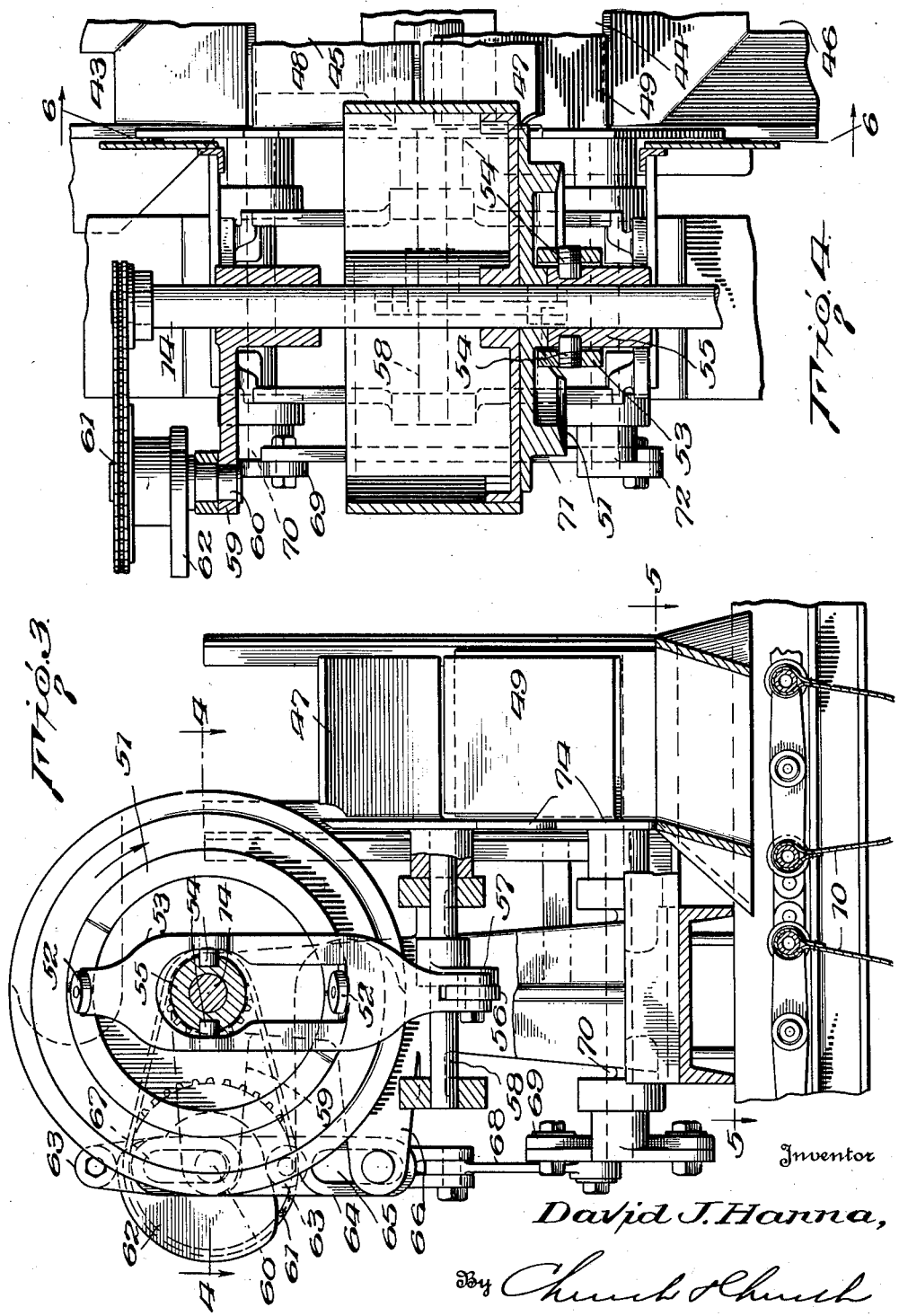

Sept. 11, 1934.  D. J. HANNA  1,973,625
FEEDING MECHANISM
Filed July 31, 1933  4 Sheets-Sheet 4
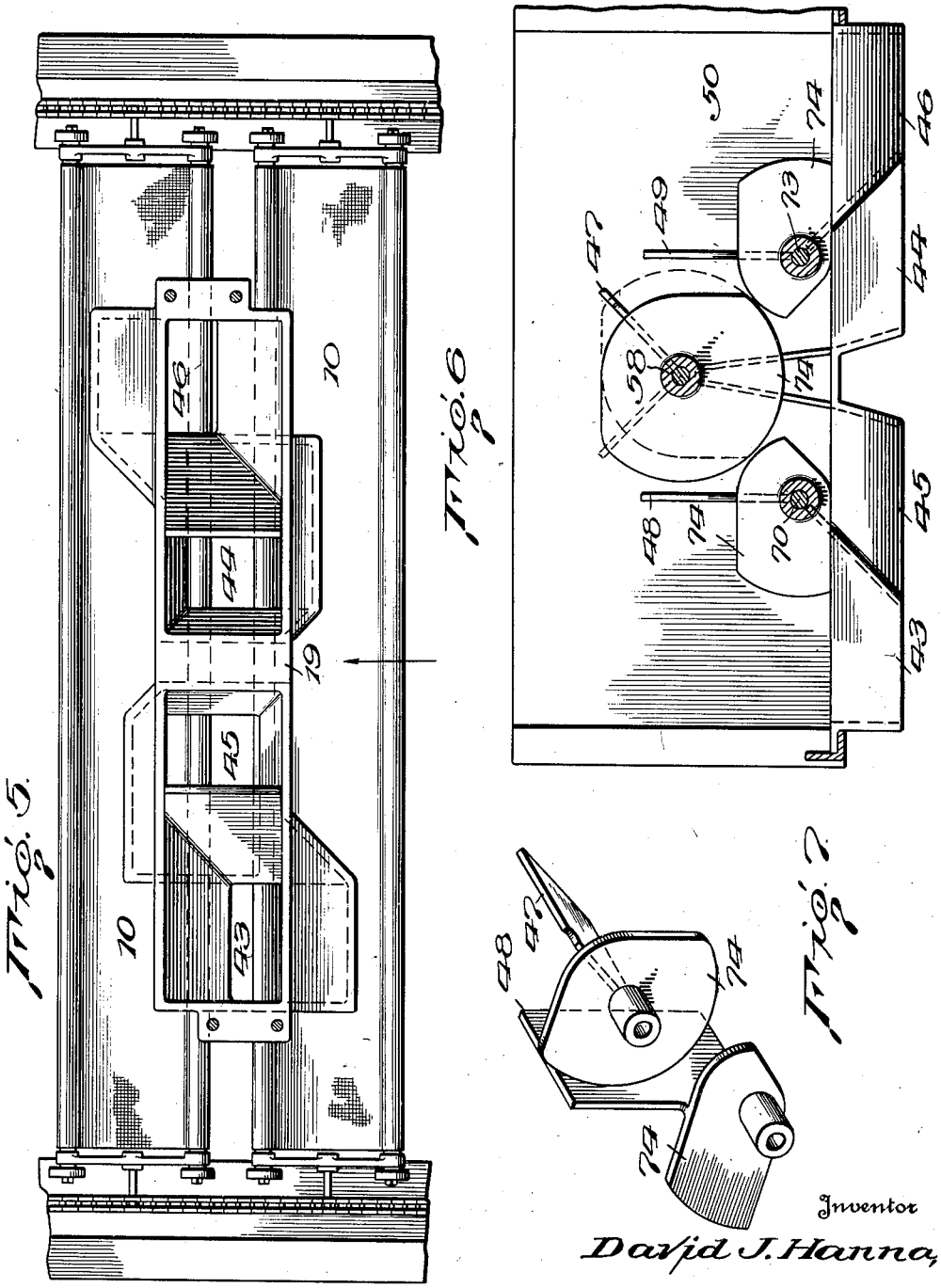
Inventor
David J. Hanna,
By Church & Church
His Attorneys Patented Sept. 11, 1934

1,973,625

UNITED STATES PATENT OFFICE 1,973,625

FEEDING MECHANISM

David J. Hanna, Beacon, N. Y., assignor to Dutchess Tool Company, Beacon, N. Y., a corporation of New York Application July 31, 1933, Serial No. 683,055

7 Claims. (Cl. 198—31)

This invention relates to improvements in feeding devices, and particularly to a feed mechanism designed especially for use in connection with dough handling apparatus of the type wherein individual lumps or increments of dough are to be treated. More specifically, the invention relates to feed mechanism utilized in depositing lumps of dough in a dough proofing apparatus after the dough has received the usual treatment in a rounding-up machine.

The primary object of the invention is to provide a feed mechanism with which the lumps of dough, as they are successively transferred from the rounding-up machine, are deposited in a continuously traveling container.

Another object is to provide a feed mechanism by which the lumps of dough successively transferred to it from the rounding-up machine are deposited in a continuously traveling container, the container being adapted to receive a plurality of lumps deposited therein in spaced relation to one another.

With these and other objects in view, the invention consists in certain details of construction and combinations and arrangements of parts, all as will be hereinafter more fully described and the novel features thereof particularly pointed out in the appended claims.

In the accompanying drawings,—

Fig. 2 is an end elevation indicated by the line 2—2, Fig. 1, a portion of the main frame of the proofer being shown in section;

Fig. 3 is a vertical sectional view on the line 3—3, Fig. 2;

Fig. 4 is a horizontal sectional view on the line 4—4, Fig. 3;

Fig. 5 is a top plan view illustrating two of the continuously traveling conveyors of the proofer and the chutes of the feed mechanism for depositing the lumps of dough in the containers.

Fig. 6 is a vertical sectional view on the line 6—6 of Fig. 4, illustrating the deflecting members by which successive lumps of dough delivered to the feed mechanism are directed or diverted to the respective discharge chutes;

Fig. 7 is a perspective view of two of the deflectors or directing members; and

Figure 1:
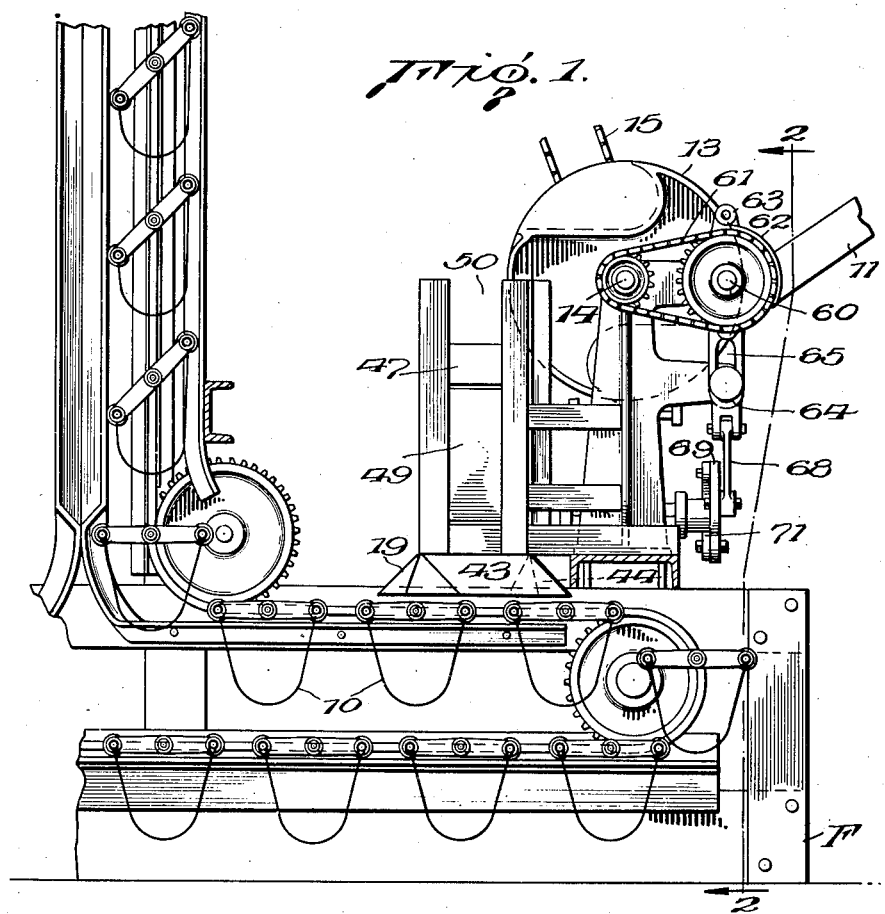
Figure 1 is an end elevational view of one end of the dough proofing apparatus with the present feed mechanism associated therewith.
Figure 8:
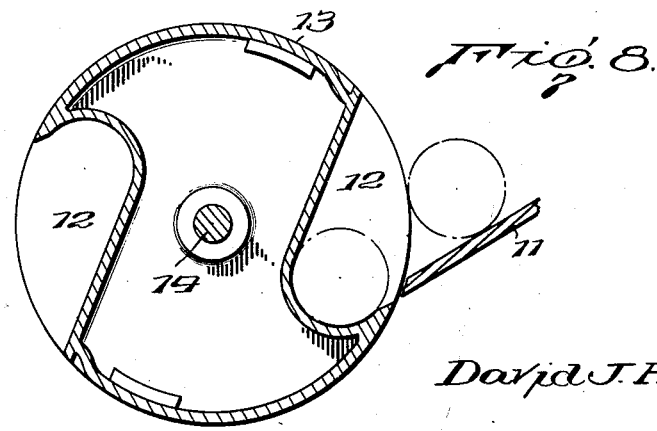
Fig. 8 is a vertical sectional view of the transfer drum by which lumps of dough coming from the rounding-up machine are deposited in the housing of the feed mechanism in proper timed sequence.

As shown in Fig. 1, the proofing apparatus comprises a main frame F in which is supported a series of endless chain of continuously moving receptacles or containers 10. The construction of the proofer proper and method by which the dough is proofed therein need not be described in detail in the present instance, as it is fully disclosed and claimed in an application, Serial No. 660,956, filed March 15, 1933 by the present applicant and the co-inventor, John M. Van Houten.

The present feed mechanism, while adaptable for use in other forms of apparatus, although especially designed for the handling of dough, is installed or associated with the receiving end, so to speak, of the proofer, the lumps of dough being deposited by the feed mechanism in the containers or receptacles 10 at the end of the proofer illustrated in Fig. 1, and discharged from said containers at the opposite end (not shown).

In the specific form of the invention illustrated, the lumps of dough are fed down a chute 11, successive lumps of dough being received in pockets 12, preferably arranged diametrically opposite in the periphery of a feed drum 13 mounted on a shaft 14. Shaft 14 is driven by drive chain 15 from a suitable source of power, not shown. As the drum 13 is rotated, successive lumps of dough fall from the pockets 12 and are thus delivered at regular intervals to the feed mechanism which deposits a certain number of successive lumps in one of the containers 10 as it progresses along its normal line of movement. This feed mechanism preferably comprises a casting 19 in which there are a plurality of chutes whose discharge ends are positioned over the containers. The several chutes are indicated at 43, 44, 45 and 46, arranged with their respective discharge openings one in advance of the other, along the line or path of movement of containers 10. That is, the discharge ends of the four chutes shown in the present instance are spaced from one another both longitudinally and laterally of the normal line of movement of the containers. As the lumps of dough fall from the pockets in drum 13 they are delivered by mechanism in such fashion that the first of a series of four lumps will be delivered to chute 43, the next to chute 44, the next to chute 45 and the last to chute 46, so that the four successive lumps of dough will all be deposited in the same container 10. In other words, the speed of rotation of drum 13 is so timed with respect to the rate of movement of the containers 10, and the disposition of the several chutes longitudinally of the line of movement of the containers is such that, as any one container passes the discharge end of the four chutes, it will have deposited therein a lump of dough.

The mechanism for diverting the lumps of dough to the several chutes consists of a plurality of deflectors in the form of pivoted guide plates 47, 48 and 49, within a passageway 50 in the feeding mechanism housing into which the lumps of dough are discharged from drum 13. The several guide plates are adapted to be rocked or flipped by a mechanism which consists of a cam member 51 mounted on shaft 14 of the delivery drum and which is engaged at diametrically opposite points by rollers 52 on a rocking lever 53 pivoted at 54 in a bushing 55 surrounding shaft 14. The lower end of rocking lever 53 is attached by a link 56 to an arm 57 mounted on the shaft 58, which carries guide plate 47. Mounted in a bracket 59 is a stub shaft 60 driven by sprocket chain 61 from the shaft 14 of the delivery drum. Mounted on stub shaft 60 is a cam 62 which is engaged by cam roller 63 carried by a reciprocatory link 64 slidably mounted by pin and slot connections 65 on the arm 66 of the bracket 59, and by the pin and slot connection formed by the shaft 60 passing through the slot 67 in said link. At its lower end, the reciprocatory link 64 is attached by connecting link 68 to one arm of a bell crank lever 69 mounted on the shaft 70 of guide plate 48. The other end of said bell crank lever is attached by a connecting link 71 to an arm 72 mounted on the shaft 73 of the guide plate 49. The contours of the cam surfaces 51 and 62 are such that, by the use of the two cam rollers 52, the guide plate 47 will be rocked twice for each time the guide plates 48, 49 are rocked, and the connections between shafts 70 and 73 are such that the guide plates 48, 49 will be rocked in unison, the two plates being held in vertical position, as shown in Fig. 6, at the same time and being rocked toward the base of guide plate 47 together, as shown in dotted lines in Fig. 2. More specifically, the cycle of operations of the several plates is as follows: With the plates in the positions in which they are shown in Fig. 2, the first lump of dough discharged from the delivery drum 13 will be diverted by plates 47, 48, into the chute 43. At the time the next lump of dough is discharged from the delivery drum, plate 47 will have been moved to the position shown in dotted lines in Fig. 6 and the plates 48, 49, will be moved to the positions in which they are shown in that figure, under which circumstances, the second lump of dough will be diverted by plate 47 into chute 44. By the time the third lump of dough is discharged from the delivery drum, plate 47 will be rocked back to its original position, or the position shown in dotted lines in Fig. 2 and in full lines in Fig. 6, but the plates 48, 49 will remain in the positions shown in Fig. 6, under which conditions, the third lump of dough will be diverted by plate 47 into chute 45. By the time the fourth of the series of lumps of dough is discharged from the delivery drum, plate 47 will have again been returned to the position shown in dotted lines in Fig. 6, and the plates 48, 49 restored to the position shown in dotted lines in Fig. 2, so that the said fourth lump of dough will roll along plates 47 and 49 into the delivery chute 46. By the time the next lump of dough, or the first lump of dough for the second series is delivered by drum 13, plate 47 will have been returned to its starting position as shown in dotted lines in Fig. 2 and during this movement of said plate, the plates 48, 49 will have remained stationary, whereupon the next cycle of operations will have been initiated and the said fifth lump of dough diverted to delivery chute 43. With this arrangement it will be seen that with the proper timing of the drum 13 and container 10, each set of four lumps of dough will be fed into the same container 10, because, although the container is constantly moving, the discharge ends of the several chutes are positioned one in advance of the other, along the path of the traveling container. If desired, the several guide plates 47, 48, 49, may be formed with transversely extending plate-like portions 74, which will assist in steadying the several guide plates in their various positions.

What I claim is:—

1. The combination with a continuously moving container, a housing having a series of chutes therein for feeding a plurality of individual bodies directly into said container while it is moving along its line of travel, the discharge end of each chute being spaced from each of the others longitudinally of the line of travel of the container and means for directing successive bodies of material to the respective chutes.

2. The combination of a continuously moving series of containers, a plurality of chutes, the discharge end of each chute being spaced from each of the others longitudinally and transversely of the line of movement of the containers, and means for delivering successive lumps of dough to the several chutes in rotation at regular intervals of time and at a rate dependent upon the speed at which the continuously moving containers are propelled along their line of movement, the lumps of dough being deposited from said chutes into said containers while the latter are in motion.

3. In a dough handling apparatus, the combination of a constantly traveling elongated container, a hopper, a plurality of feeding chutes, the discharge opening of each chute being spaced from the others longitudinally of the traveling container, and means for directing lumps of dough from said hopper to successive chutes in predetermined order the lumps of dough being deposited from said chutes into said container while the latter is in motion.

4. In a dough handling apparatus, the combination of a constantly moving container, a hopper, a plurality of feeding chutes each chute having its discharge end arranged in spaced relation with respect to the others longitudinally of the path in which said container moves and means for directing a group of individual lumps of dough from said hopper to said chutes, the first lump of each group being directed in the rearmost chute and each successive lump being directed to the next advanced chute.

5. In a dough handling apparatus, the combination of a constantly traveling container, two pairs of feed chutes, the discharge ends of said chutes being arranged one in advance of the other with respect to the path of travel of said container, and mechanism for depositing lumps of dough in said chutes comprising means for directing one set of alternate lumps of dough to one pair of chutes and the other set of alternate lumps to the other pair of chutes, and means for directing the lumps of one set of lumps alternately to the chutes of one pair and the lumps of the other set alternately to the other pair of chutes, the several lumps being deposited in the chutes in the order in which the discharge ends of said chutes are progressively arranged with respect to the moving container.

6. In a dough handling apparatus, the combination of a constantly traveling container, a series of feeding chutes having their ends arranged one in advance of the other with respect to the direction of movement of the container, means for directing successive lumps of dough to the individual chutes in the order in which the discharge ends of the chutes are arranged progressively of the movement of the container, and means for delivering lumps of dough to said directing means in predetermined timed relation dependent upon the rate of speed at which the container is moving.

7. In a dough handling apparatus, the combination of a constantly traveling container, a series of feeding chutes having their discharge ends arranged one in advance of the other relatively to the direction of movement of the container, and means for depositing lumps of dough in the several chutes in the order in which the ends of said chutes are progressively arranged relatively to the traveling container and in predetermined timed relation dependent upon the rate of speed at which the container is moving.

DAVID J. HANNA.